United States Patent
Xie et al.

(10) Patent No.: US 11,552,354 B2
(45) Date of Patent: Jan. 10, 2023

(54) SECONDARY BATTERY

(71) Applicant: JIANGSU CONTEMPORARY AMPEREX TECHNOLOGY LIMITED, Liyang (CN)

(72) Inventors: Mianyu Xie, Liyang (CN); Chenchen Zhang, Liyang (CN); Yongbin Wu, Liyang (CN); Shaojun Niu, Liyang (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 136 days.

(21) Appl. No.: 16/586,602

(22) Filed: Sep. 27, 2019

(65) Prior Publication Data

US 2021/0013459 A1    Jan. 14, 2021

Related U.S. Application Data

(63) Continuation of application No. PCT/CN2019/098382, filed on Jul. 30, 2019.

(30) Foreign Application Priority Data

Jul. 8, 2019  (CN) .......................... 201921061270.8

(51) Int. Cl.
*H01M 50/10*        (2021.01)
*H01M 50/183*       (2021.01)
(52) U.S. Cl.
CPC ......... *H01M 50/10* (2021.01); *H01M 50/183* (2021.01)
(58) Field of Classification Search
CPC ..... H01M 50/10; H01M 50/183; H01M 50/20
See application file for complete search history.

(56) References Cited

U.S. PATENT DOCUMENTS

2006/0147793 A1*  7/2006  Kim .................. H01M 4/70
                                                       429/94
2006/0154138 A1   7/2006  Miyamoto et al.
(Continued)

FOREIGN PATENT DOCUMENTS

CN    1758474 A    4/2006
CN  105514352 A    4/2016
(Continued)

OTHER PUBLICATIONS

Jiangsu Contemporary Amperex Technology Limited, the Extended European Search Report, EP19769978.8, dated Jan. 11, 2021, 7 pgs.
(Continued)

*Primary Examiner* — Kenneth J Douyette
(74) *Attorney, Agent, or Firm* — Morgan, Lewis & Bockius LLP

(57)  ABSTRACT

The present disclosure provides a secondary battery, which comprises an electrode assembly, a pouch, an electrode lead and an insulating tape. The electrode assembly is received in the pouch, the electrode lead is connected with the electrode assembly and extends to the outside of the pouch in a length direction. The electrode assembly comprises electrode plates and a separator, the separator separates the electrode plates. An outer surface of the electrode assembly comprises a first surface and a second surface, an area of the second surface is smaller than an area of the first surface. The first surface is provided as two in number, and the two first surfaces face each other in a thickness direction; the second surface is provided as two in number, and the two second surfaces face each other in a width direction, each second surface connects two first surfaces. At least a part of the insulating tape is provided on the second surface; in the length direction, at least one end of the insulating tape exceeds the electrode plate.

20 Claims, 8 Drawing Sheets

(56) References Cited

U.S. PATENT DOCUMENTS

| | | | |
|---|---|---|---|
| 2006/0216594 A1* | 9/2006 | You | H01M 50/543 |
| | | | 429/162 |
| 2010/0035132 A1 | 2/2010 | Park | |
| 2010/0310912 A1* | 12/2010 | Kim | H01M 10/052 |
| | | | 429/94 |
| 2012/0244423 A1* | 9/2012 | Kusukawa | H01M 50/191 |
| | | | 429/178 |
| 2013/0189567 A1* | 7/2013 | Yang | H01M 10/04 |
| | | | 429/178 |
| 2015/0288022 A1* | 10/2015 | Lee | H01M 50/116 |
| | | | 429/94 |
| 2016/0099456 A1 | 4/2016 | Kwon et al. | |
| 2017/0170524 A1 | 6/2017 | Zhu et al. | |
| 2019/0165339 A1* | 5/2019 | Jiang | H01M 50/24 |

FOREIGN PATENT DOCUMENTS

| | | |
|---|---|---|
| CN | 207398186 U | 5/2018 |
| CN | 207602628 U | 7/2018 |
| JP | 2017111966 A | 6/2017 |
| KR | 20150130002 A | 11/2015 |
| KR | 101861888 B1 | 5/2018 |

OTHER PUBLICATIONS

Jiangsu Contemporary Amperex Technology Limited, International Search Report and Written Opinion, PCT/CN2019/0983 82, dated Apr. 3, 2020, 9 pgs.—No English Translation Available-.

* cited by examiner

SECONDARY BATTERY

REFERENCE TO RELATED APPLICATIONS

This application is a continuation application of PCT/CN2019/098382, filed on Jul. 30, 2019, which claims priority to Chinese Patent Application No. 201921061270.8, filed with the National Intellectual Property Administration of the People's Republic of China on Jul. 8, 2019, all of which are incorporated herein by reference in their entirety.

FIELD OF THE PRESENT DISCLOSURE

The present disclosure relates to the field of battery, and particularly relates to a secondary battery.

BACKGROUND OF THE PRESENT DISCLOSURE

With the rapid development of portable electronic equipment, the requirement on the energy density of the battery is higher and higher. In a secondary battery, it may use a pouch made of an aluminum-plastic film or a steel-plastic film instead of a metal case, so as to reduce the weight of the battery and improve the energy density.

The pouch generally forms a cavity by stamping to receive an electrode assembly of the secondary battery. However, when stamping, the pouch will be stretched to a larger extent at a corner region, which leads to the corner region thinner. After the secondary battery is packaged, the pouch is kept in a low negative pressure state inside, a distance between the corner region of the pouch and the electrode assembly is small, so the corner region is easy to be pierced by an end portion of an electrode plate of the electrode assembly, thereby influencing the sealing performance of the pouch.

SUMMARY OF THE PRESENT DISCLOSURE

In view of the problem existing in the background, an object of the present disclosure is to provide a secondary battery, which can reduce a risk that the pouch is pierced and improve sealing performance.

In order to achieve the above object, the present disclosure provides a secondary battery, which comprises an electrode assembly, a pouch, an electrode lead and an insulating tape. The electrode assembly is received in the pouch, the electrode lead is connected with the electrode assembly and extends to the outside of the pouch in a length direction. The electrode assembly comprises electrode plates and a separator, the separator separates the electrode plates. An outer surface of the electrode assembly comprises a first surface and a second surface, an area of the second surface is smaller than an area of the first surface. The first surface is provided as two in number, and the two first surfaces face each other in a thickness direction; the second surface is provided as two in number, and the two second surfaces face each other in a width direction, each second surface connects two first surfaces. At least a part of the insulating tape is provided on the second surface; in the length direction, at least one end of the insulating tape exceeds the electrode plate.

The insulating tape comprises a first portion and a second portion, the second portion is bonded on the second surface, the first portion is connected with an end portion of the second portion close to the first surface and bonded on the first surface.

In the width direction, an end portion of the first portion away from the second portion does not exceed a midline of the first surface.

A dimension of the first portion in the width direction is larger than 2 mm.

A thickness of the insulating tape is 10 µm~50 µm, an elastic modulus of the insulating tape is 1 Gpa~6 Gpa.

A tail end of the separator forms a termination line, and the insulating tape at least covers a part of the termination line.

In the length direction, an end portion of the insulating tape exceeds the separator.

The insulating tape is provided as plurality in number, the plurality of insulating tapes comprise a first insulating tape and a second insulating tape, the first insulating tape and the second insulating tape are respectively provided on two second surfaces. In the length direction, two ends of the first insulating tape and two ends of the second insulating tape exceed the electrode plate.

The insulating tape is provided as plurality in number, the plurality of insulating tapes comprises a first insulating tape and a second insulating tape. The first insulating tape and the second insulating tape are provided on one second surface and spaced apart from each other in the length direction. In the length direction, an end portion of the first insulating tape away from the second insulating tape exceeds one end of the electrode plate, an end portion of the second insulating tape away from the first insulating tape exceeds the other end of the electrode plate.

The pouch comprises two packaging films, and at least one packaging film forms a cavity, the two packaging films are connected around the cavity to form a sealing portion. The electrode assembly is positioned between the two packaging films and received in the cavity. Each packaging film comprises a protecting layer, a metal layer and a connecting layer, the connecting layer is provided on a surface of the metal layer facing the electrode assembly, the protecting layer is provided on a surface of the metal layer away from the electrode assembly. The electrode lead passes through between the two packaging films.

The present disclosure has the following beneficial effects: a cavity is formed by stamping the pouch, and a thickness at a corner region of the cavity is small, so the present disclosure preferably provides the insulating tape on the second surface. The part of the insulating tape exceeding the electrode plate in the length direction can separate the burrs of the electrode plate and the corner region, thereby reducing the risk that the pouch is pierced and improving sealing performance.

Figure 1:
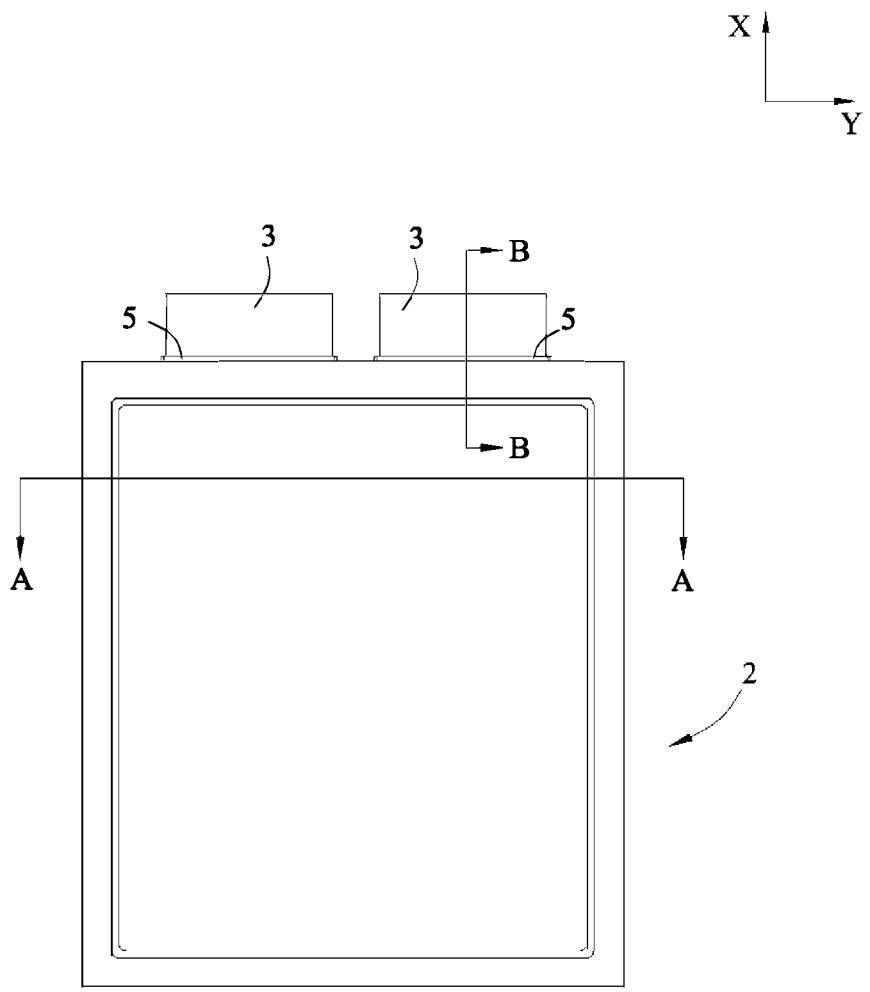
FIG. 1 is a schematic view of a first embodiment of a secondary battery according to the present disclosure.

Reference numerals in figures are represented as follows:
1 electrode assembly
  11 electrode plate
    111 current collector
    112 active material layer
  12 electrode tab
  13 separator
  14 first surface
  15 second surface
2 pouch
  21 sealing portion
  22 packaging film
    221 protecting layer
    222 metal layer
    223 connecting layer
  23 cavity
3 electrode lead
4 insulating tape
  41 first portion
  42 second portion
  4a first insulating tape
  4b second insulating tape
  4c third insulating tape
  4d fourth insulating tape
5 separating member
G corner region
L termination line
X length direction
Y width direction
Z thickness direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third" and "fourth" are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

Figure 2:
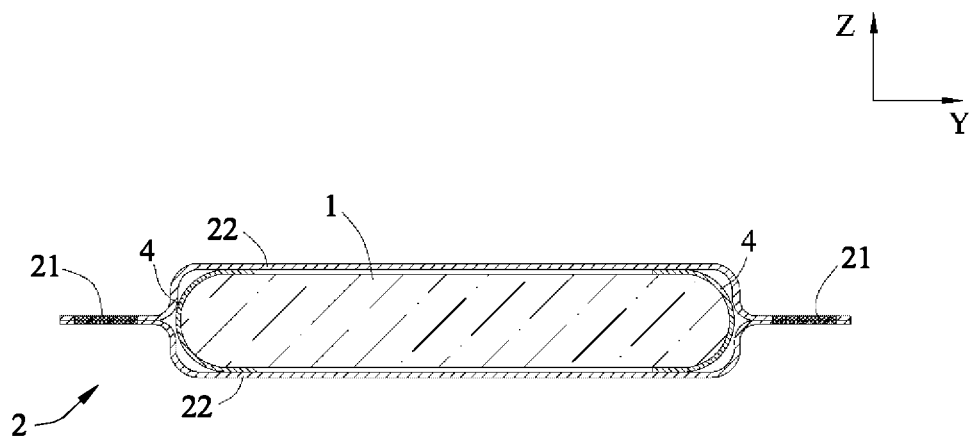
FIG. 2 is a cross sectional view taken along a line A-A of FIG. 1.

Referring to FIG. 1 and FIG. 2, in a first embodiment, a secondary battery of the present disclosure comprises an electrode assembly 1, a pouch 2, an electrode lead 3 and a separating member 5.

Figure 7:
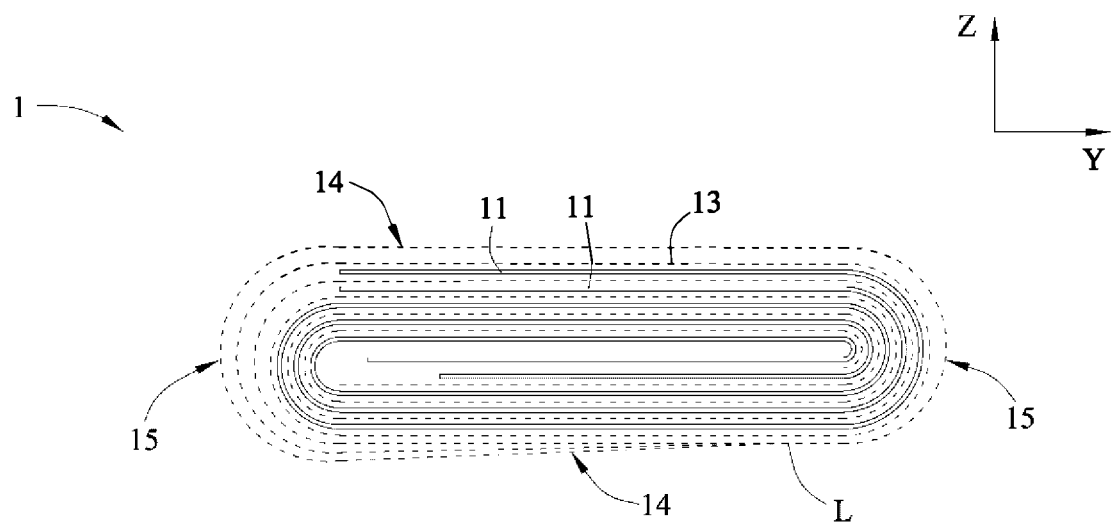
FIG. 7 is a cross sectional view of the electrode assembly of FIG. 6.

The electrode assembly 1 is a core component of the secondary battery to realize the function of charge and discharge. The electrode assembly 1 comprises electrode plates 11 and a separator 13, the separator 13 separates the electrode plates 11. In the present disclosure, the electrode assembly 1 is a wound structure. Referring to FIG. 7, the electrode plates 11 are provided as two in number, the two electrode plates 11 respectively are a positive electrode plate and a negative electrode plate. The positive electrode plate, the negative electrode plate and the separator 13 are belt-shaped structures. The positive electrode plate, the separator 13 and the negative electrode plate are stacked sequentially and wound to two or more turns to form the electrode assembly 1, and the electrode assembly 1 is in a flat shape.

Figure 11:
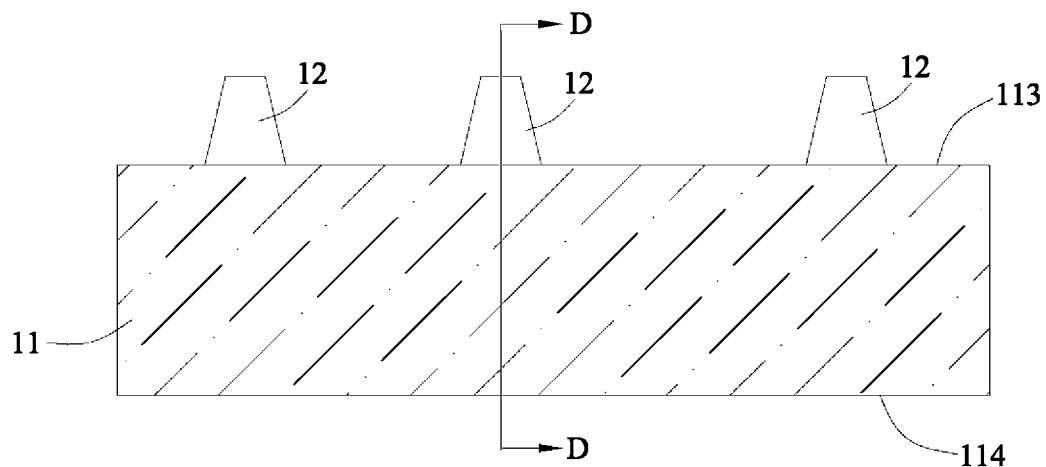
FIG. 11 is a schematic view of an electrode plate and an electrode tab in a spread state.
Figure 12:
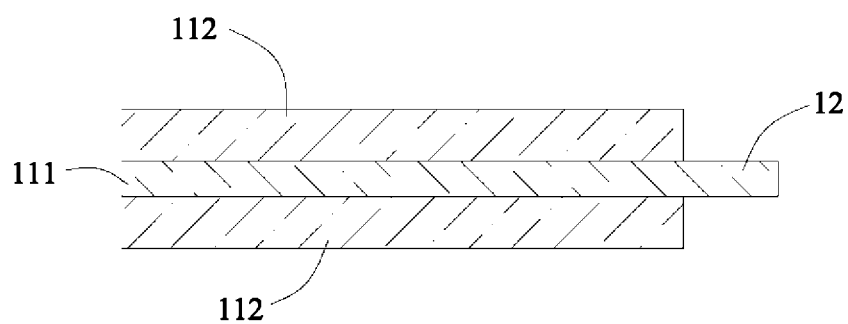
FIG. 12 is a cross sectional view taken along a line D-D of FIG. 11.

Referring to FIG. 11 and FIG. 12, the electrode plate 11 comprises a current collector 111 and an active material layer 112 coated on a surface of the current collector 111. For the negative electrode plate, the current collector 111 is a copper foil; the active material layer 112 comprises graphite or silicon. For the positive electrode plate, the current collector 111 is an aluminum foil, the active material layer 112 comprises ternary material, lithium manganese oxide or lithium iron phosphate.

Figure 6:
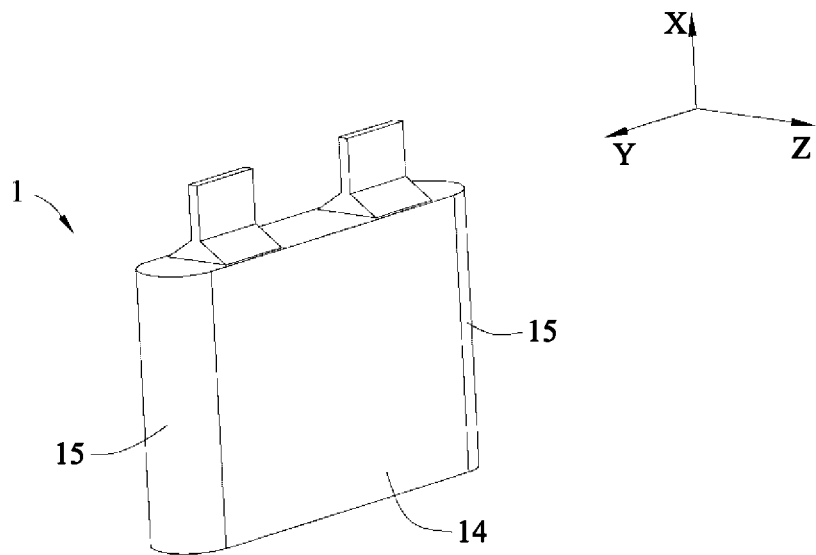
FIG. 6 is a schematic view of an electrode assembly of FIG. 3.

In order to ensure insulation performance, in a length direction X, a dimension of the separator 13 is larger than a dimension of each electrode plate 11. Specifically, at one end of the electrode assembly 1 in the length direction X, one end of the separator 13 exceeds the electrode plates 11; at the other end of the electrode assembly 1 in the length direction X, the other end of the separator 13 exceeds the electrode plates 11. FIG. 6 and FIG. 7 show the profile of the electrode assembly 1. An outer surface of the electrode assembly 1 comprises a first surface 14 and a second surface 15, the first surface 14 is provided as two in number, and the two first surfaces 14 face each other in a thickness direction Z; the second surface 15 is provided as two in number, and the two second surfaces 15 face each other in a width direction Y, each second surface 15 connects two first surfaces 14. An area of the second surface 15 is smaller than an area of the first surface 14. The first surface 14 is a relatively flat surface and not required to be an absolute plane. At least a part of the second surface 15 is in the shape of arc.

Figure 3:
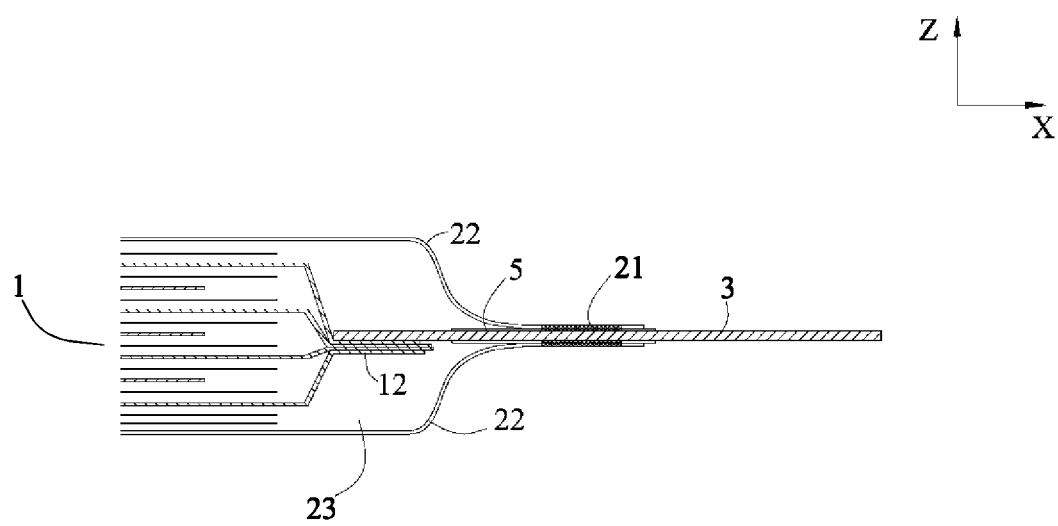
FIG. 3 is a cross sectional view taken along a line B-B of FIG. 1.
Figure 4:
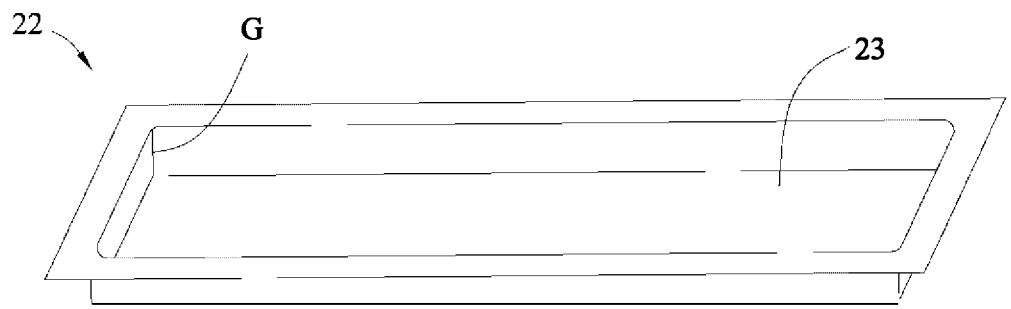
FIG. 4 is a schematic view of a packaging film of a pouch of FIG. 3.

Referring to FIG. 2 and FIG. 3, the pouch 2 comprises two packaging films 22, the two packaging films 22 are arranged up and down in the thickness direction Z. Referring to FIG. 4, at least one packaging film 22 forms a cavity 23 by stamping, and the electrode assembly 1 is positioned between the two packaging films 22 and received in the cavity 23.

Figure 5:
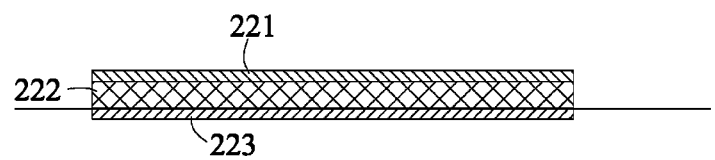
FIG. 5 is a cross sectional view of the packaging film of FIG. 4.

Referring to FIG. 5, each packaging film 22 comprises a protecting layer 221, a metal layer 222 and a connecting layer 223, the protecting layer 221 and the connecting layer 223 are respectively provided at two sides of the metal layer 222. Specifically, the protecting layer 221 can be fixed with a surface of the metal layer 222 away from the electrode assembly 1 via an adhesive; the connecting layer 223 can be fixed with a surface of the metal layer 222 close to the electrode assembly 1 via an adhesive.

The material of the protecting layer 221 may be nylon or polyethylene terephthalate, the material of the metal layer 222 may be an aluminum foil or a steel foil, the material of the connecting layer 223 may be polypropylene.

The two packaging films 22 are connected around the cavity 23 to form a sealing portion 21. Specifically, by heat press, the connecting layers 22 of the two packaging films 22 are directly connected or indirectly connected, thereby forming a sealed pouch 2. In the process of heat press, the connecting layers 223 are melted and compressed; therefore, after the process of heat press, a thickness of the sealing portion 21 is less than a sum of the thicknesses of the two packaging films 22 before heat press.

Referring to FIG. 3, the electrode lead 3 is connected with the electrode assembly 1, passes through the sealing portion 21 and extends to the outside of the pouch 2. Specifically, the electrode lead 3 may be provided as two in number, one electrode lead 3 is electrically connected with the positive electrode plate, the other electrode lead 3 is electrically connected with the negative electrode plate. The two electrode leads 3 connect the electrode assembly 1 and other components outside the pouch 2, and in turn achieve the charge and discharge of the electrode assembly 1. The material of the electrode lead 3 may be aluminum, nickel or nickel-plated copper.

The two electrode leads 3 extend in the length direction X. In the embodiment, the two electrode leads 3 extend at one side of the pouch 2 in the length direction X. Certainly, in an alternative embodiment, the two electrode leads 3 also can respectively extend at two sides of the pouch 2 in the length direction X.

The electrode lead 3 passes through between the two packaging films 22. The connecting layer 223 is thin, so the electrode lead 3 is easy to contact the metal layer 222, thereby causing safety risk. Therefore the secondary battery of the present disclosure is preferably provided with the separating member 5.

The separating member 5 may be provided as two in number. The two separating members 5 respectively separate the two electrode leads 3 and the sealing portion 21. Each separating member 5 surrounds one corresponding electrode lead 3. A part of the separating member 5 is clamped between the two packaging films 22, thereby separating the electrode lead 3 and the packaging film 22, reducing the risk that the electrode lead 3 contacts the metal layer 222. The material of the separating member 5 may be polypropylene.

A part of the separating member 5 is clamped between the two packaging films 22, so when the two packaging films 22 are heat pressed, the connecting layers 223 of the two packaging films 22 will be welded with the separating member 5.

In order to transmit the current of the electrode plate 11 to the electrode lead 3 conveniently, referring to FIG. 3 and FIG. 11, the electrode assembly 1 of the present disclosure further comprises an electrode tab 12, the electrode tab 12 connects the electrode lead 3 and the current collector 111 of the electrode plate 11. Preferably, each current collector 111 of the electrode plate 11 may be connected with a plurality of electrode tabs 12; when the electrode plates 11 and the separator 13 are wound together, the plurality of electrode tabs 12 stack together and are capable of being welded to the electrode lead 3.

Figure 13:
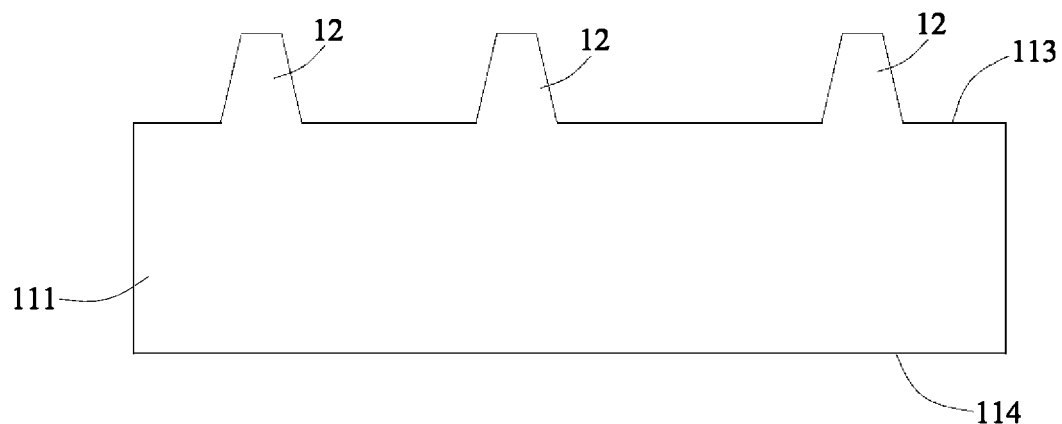
FIG. 13 is another schematic view of the electrode plate and the electrode tab of FIG. 11 with an active material layer omitted.

The electrode tabs 12 and the current collector 111 of the electrode plate 11 may be formed separately, for example, the electrode tabs 12 may be connected with the current collector 111 by welding. Preferably, the electrode tabs 12 and the current collector 111 of the electrode plate 11 are formed integrally. Referring to FIG. 13, the current collector 111 and the plurality of electrode tabs 12 are formed by cutting a metal foil.

In the forming process of the electrode plate 11, it needs to do cutting processes, which leads to burrs generated at two end portion 113, 114 of the current collector 111, especially the end portion 113 connected with the electrode tab 12. In addition, the active material layer 112 is coated on the surface of the current collector 111, the active material layer 112 will not exceed the current collector 111, and therefore end portions of the electrode plate 11 of the present disclosure refer to the two end portions 113, 114 of the current collector 111.

Referring to FIG. 4, the cavity 23 is formed by stamping the packaging film 22, and in the process of stamping, the packaging film 22 is stretched to a larger extent at a corner region G, which leads to the metal layer 222 at the corner region G thinner.

When the electrode assembly 1 is positioned in the cavity 23, a part of the electrode assembly 1 close to the second surface 15 faces the corner region G in the length direction X. When the secondary battery is formed, the pouch 2 is kept in a low negative pressure state inside, a distance between the part of the electrode assembly 1 close to the second surface 15 and the corner region G is small; meanwhile, the metal layer 222 at the corner region G is thinner and the strength of the metal layer 222 at the corner region G is lower, so when the secondary battery vibrates, the corner region G is easy to be pierced by the burrs of the end portion of the electrode plate 11, thereby leading to leakage of electrolyte and causing safety risk.

Therefore, preferably, the secondary battery of the present disclosure further comprises an insulating tape 4, at least a part of the insulating tape 4 is provided on the second surface 15; in the length direction X, at least one end of the insulating tape 4 exceeds the electrode plate 11.

The risk that the corner region G is pierce by the part of the electrode assembly 1 close to the second surface 15 is highest, so the present disclosure preferably provides the insulating tape 4 on the second surface 15. The part of the insulating tape 4 exceeding the electrode plate 11 in the length direction X can separate the burrs of the electrode plate 11 and the corner region G, thereby reducing the risk that the packaging film 22 is pierced and improving sealing performance.

When the secondary battery vibrates, the corner region G will press the insulating tape 4, which leads to the part of the insulating tape 4 exceeding the electrode plate 11 in the length direction X bending towards the electrode plate 11, thereby making the insulating tape 4 cover the burrs of the end portion of the electrode plate 11, and avoiding the corner region G being pierced by the burrs.

Figure 9:
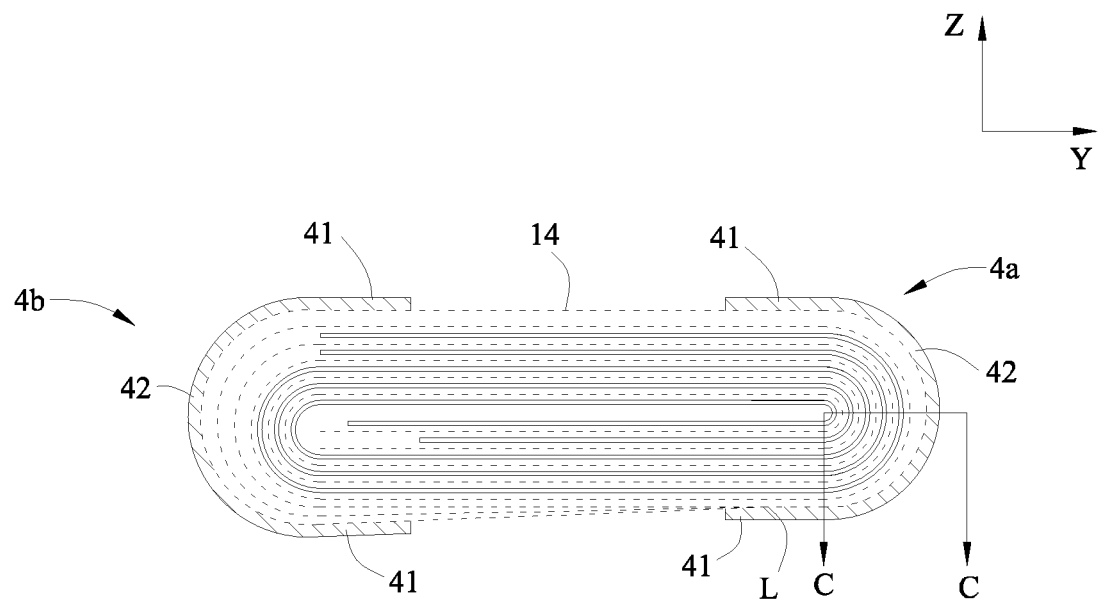
FIG. 9 is a bottom view of the secondary battery of FIG. 8.
Figure 10:
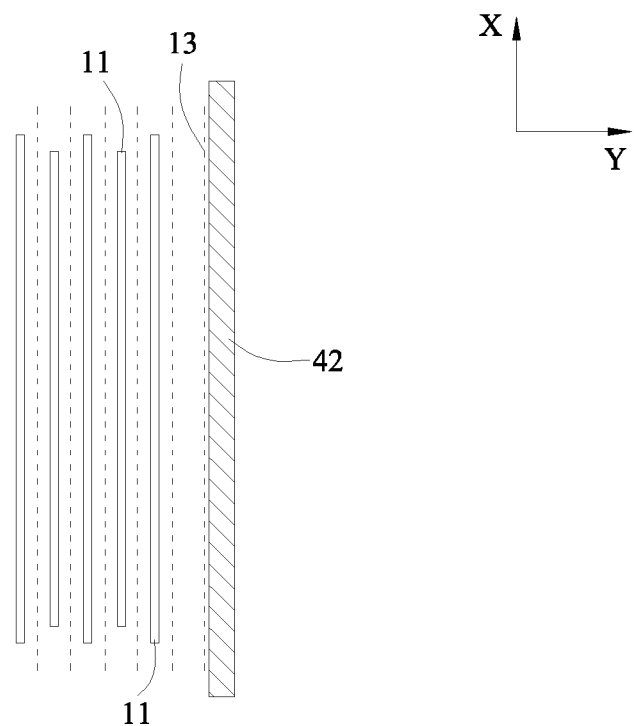
FIG. 10 is a cross sectional view taken along a line C-C of FIG. 9.

Referring to FIG. 9, the insulating tape 4 comprises a first portion 41 and a second portion 42, the second portion 42 is bonded on the second surface 15, the first portion 41 is connected with an end portion of the second portion 42 close to the first surface 14 and bonded on the first surface 14. The second portion 42 can separate the burrs of the electrode plate 11 and the corner region G, thereby reducing the risk that the packaging film 22 is pierced. By providing the first portion 41, it can increase the connecting area between the insulating tape 4 and the electrode assembly 1, and reduce the risk that the insulating tape 4 falls off. In addition, the first portion 41 also can exert the function of separating the electrode plate 11 and the packaging film 22.

In the process of charge or discharge, the electrode assembly 1 will expand, and the expansion of a part of the electrode assembly 1 close to a midline of the first surface 14 in the width direction Y is maximum. If the first portion 41 covers the midline of the first surface 14, in the process of charge or discharge, the first portion 41 will seriously limit the expansion of the electrode assembly 1, which leads to the expanding stress being difficult to release and results in risk of precipitate of lithium. Therefore the first portion 41 can not cover the midline of the first surface 14, that is, in the width direction Y, an end portion of the first portion 41 away from the second portion 42 does not exceed the midline of the first surface 14.

When the secondary battery expands, compared to the first surface 14, the second surface 15 deforms more seriously, so the risk that the second portion 42 is separated with the second surface 15 is higher. If a dimension of the first portion 41 in the width direction Y is smaller, the connecting strength between the first portion 41 and the first surface 14 is lower, so when the secondary battery expands, the risk that the insulating tape 4 is detached from the electrode assembly 1 is higher. Therefore, in order to ensure the connecting strength between the electrode assembly 1 and the insulating tape 4, the dimension of the first portion 41 in the width direction Y is larger than 2 mm.

The insulating tape 4 is an insulating adhesive tape, if a thickness of the insulating tape 4 is too small, the viscosity of the insulating tape 4 will be insufficient, and the insulating tape 4 is easy to fall off from the electrode assembly 1. If the thickness of the insulating tape 4 is too large, the insulating tape 4 will occupy a large space and influence the energy density. Therefore, preferably, the thickness of the insulating tape 4 is 10 μm~50 μm.

In addition, the insulating tape 4 needs to bend to cover the burrs of the end portion of the electrode plate 11, if an elastic modulus of the insulating tape 4 is too high, the insulating tape 4 is difficult to bend, and cannot achieve the function of covering the burrs. Therefore, preferably, the elastic modulus is 1 Gpa~6 Gpa.

Referring to FIG. 7 and FIG. 9, in the electrode assembly 1, a tail end of the separator 13 forms a termination line L. In known technology, it generally attaches an adhesive tape on the termination line L, so as to prevent the separator 13 loosening. In the present disclosure, the insulating tape 4 at least covers a part of the termination line L. The insulating tape 4 of the present disclosure can exert the function of covering the burrs and fixing the separator 13 at the same time, thereby simplifying the attaching process.

In the length direction X, an end portion of the insulating tape 4 exceeds the separator 13. A part of the insulating tape 4 exceeding the separator 13 can bend to the separator 13 and be bonded with the separator 13, thereby improving bonding area between the insulating tape 4 and the separator 13. Preferably, in the length direction X, the end portion of the insulating tape 4 exceeds the separator by 0.1 mm-0.5 mm.

Figure 8:
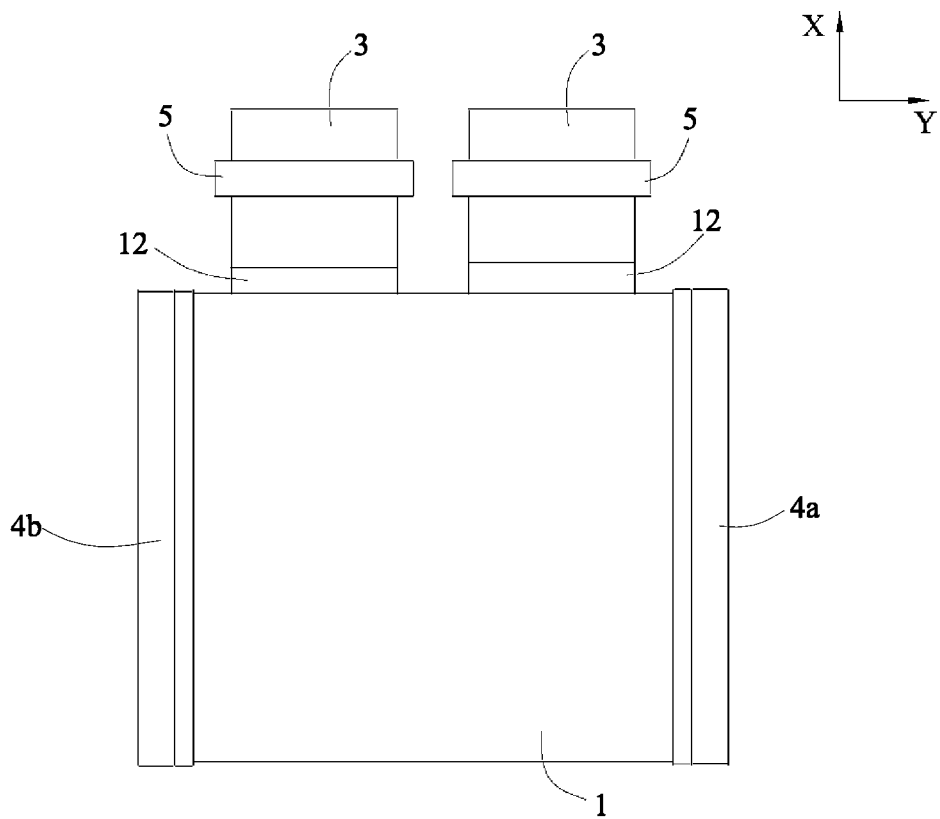
FIG. 8 is another schematic view of the secondary battery of FIG. 1 with the pouch omitted.

Referring to FIG. 8 and FIG. 9, in the embodiment, the insulating tape 4 is provided as plurality in number, the plurality of insulating tapes 4 comprise a first insulating tape 4a and a second insulating tape 4b, the first insulating tape 4a and the second insulating tape 4b are respectively provided on two second surfaces 15. In the length direction X, two ends of the first insulating tape 4a and two ends of the second insulating tape 4b exceed the electrode plate 11. The first insulating tape 4a and the second insulating tape 4b may completely cover the two second surfaces 15, so as to maximize the bonding area between the first insulating tape 4a and the electrode assembly 1 and the bonding area between the second insulating tape 4b and the electrode assembly 1, and ensure connecting strength.

Hereinafter the other embodiments of the secondary battery of the present disclosure will be described. In order to simplify description, hereinafter only the differences between the other embodiments and the first embodiment are described in detail, the undescribed part can be understood referring to the first embodiment.

Figure 14:
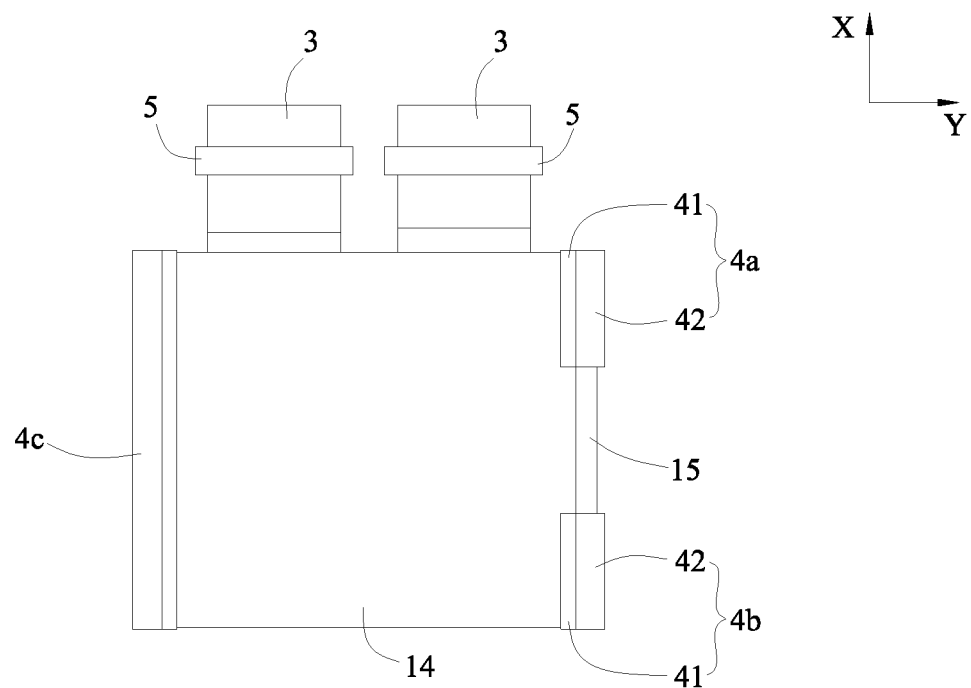
FIG. 14 is a schematic view of a second embodiment of the secondary battery according to the present disclosure with the pouch omitted.

Referring to FIG. 14, in a second embodiment, the insulating tape 4 is provided as three in number, the three insulating tapes 4 are a first insulating tape 4a, a second insulating tape 4b and a third insulating tape 4c.

The first insulating tape 4a and the second insulating tape 4b are provided on one second surface 15 and spaced apart from each other in the length direction X, the third insulating tape 4c is provided on the other second surface 15.

In the length direction X, an end portion of the first insulating tape 4a away from the second insulating tape 4b exceeds one end of the electrode plate 11, an end portion of the second insulating tape 4b away from the first insulating tape 4a exceeds the other end of the electrode plate 11. In the length direction X, two ends of the third insulating tape 4c exceed the electrode plate 11.

Compared to the first embodiment, the second embodiment can decrease the usage of the insulating tape 4, reduce the space occupied by the insulating tape 4, and improve the energy density of the secondary battery.

Figure 15:
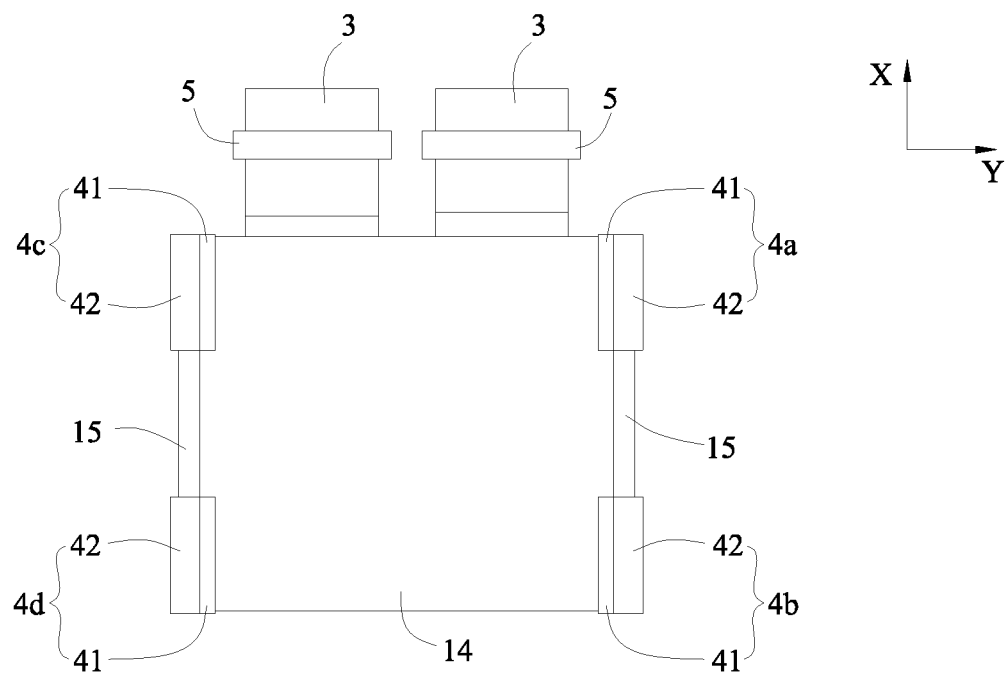
FIG. 15 is a schematic view of a third embodiment of the secondary battery according to the present disclosure with the pouch omitted.

Referring to FIG. 15, in a third embodiment, the insulating tape 4 is provided as four in number, the four insulating tapes 4 are a first insulating tape 4a, a second insulating tape 4b, a third insulating tape 4c and a fourth insulating tape 4d.

The first insulating tape 4a and the second insulating tape 4b are provided on one second surface 15 and spaced apart from each other in the length direction X, the third insulating tape 4c and the fourth insulating tape 4d are provided on the other one second surface 15 and spaced apart from each other in the length direction X.

In the length direction X, an end portion of the first insulating tape 4a away from the second insulating tape 4b exceeds one end of the electrode plate 11, an end portion of the second insulating tape 4b away from the first insulating tape 4a exceeds the other one of the electrode plate 11. In the length direction X, an end portion of the third insulating tape 4c away from the fourth insulating tape 4d exceeds the one end of the electrode plate 11, an end portion of the fourth insulating tape 4d away from the third insulating tape 4c exceeds the other end of the electrode plate 11.

Compared to the second embodiment, the third embodiment can further decrease the usage of the insulating tape 4.

Figure 16:
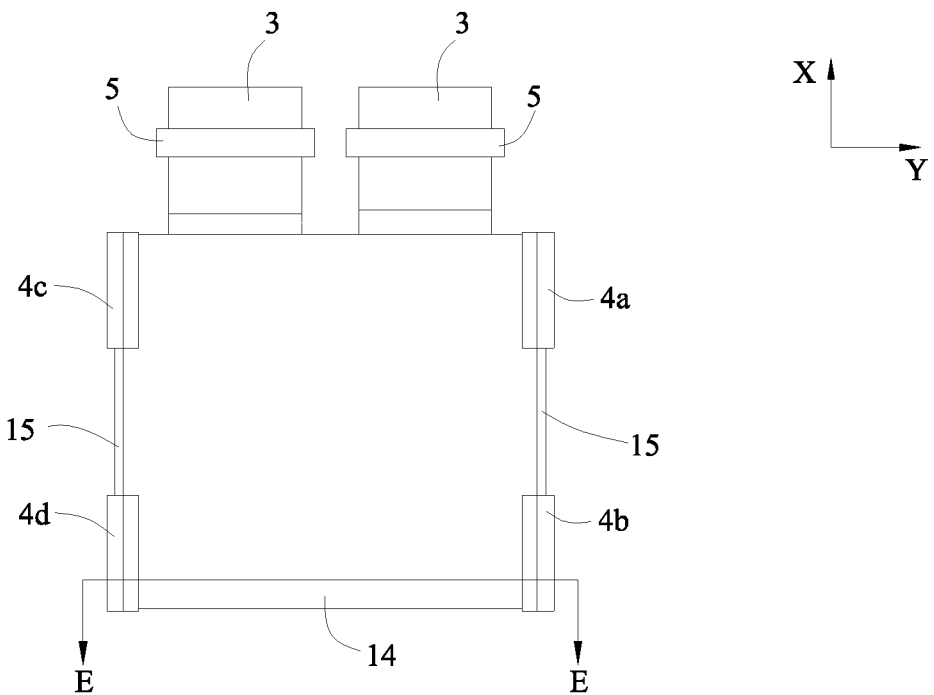
FIG. 16 is a schematic view of a fourth embodiment of the secondary battery according to the present disclosure with the pouch omitted.
Figure 17:
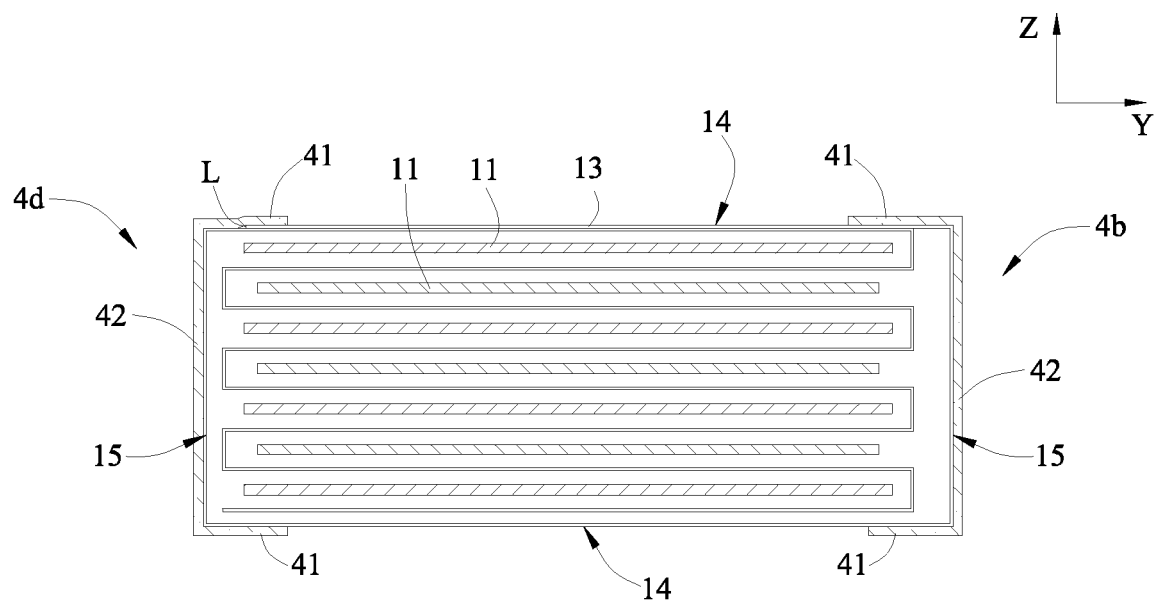
FIG. 17 is a schematic view taken along a line E-E of the secondary battery of FIG. 16.

Referring to FIG. 16 and FIG. 17, in a fourth embodiment, the electrode assembly 1 is in a stacked structure. Specifically, a plurality of electrode plates 11 are sequentially stacked in the thickness direction Z, a separator 13 separates adjacent electrode plates 11.

In order to reduce the offset between the electrode plates 11, the separator 13 can be wound around an periphery of the electrode assembly 1 to one or two turns. A tail end of the separator 13 after winding forms a termination line L, and the first portion 41 of the insulating tape 4 can cover a part of the termination line L to avoid separator 13 loosening.

What is claimed is:

1. A secondary battery, comprising an electrode assembly, a pouch, an electrode lead and an insulating tape;
   the electrode assembly being received in the pouch, the electrode lead being connected to the electrode assembly and extending to be outside of the pouch in a length direction of the electrode assembly;
   the electrode assembly comprising electrode plates and two independent separators, the two separators separating the electrode plates;
   an outer surface of the electrode assembly comprising a first surface and a second surface, an area of the second surface being smaller than an area of the first surface;
   the first surface being provided as two in number, and the two first surfaces facing each other in a thickness direction of the electrode assembly;
   the second surface being provided as two in number, and the two second surfaces facing each other in a width direction of the electrode assembly, each second surface connecting two first surfaces;
   at least a part of the insulating tape being provided on the second surface in the length direction, at least one end of the insulating tape exceeding the electrode plates in the length direction,
   the electrode assembly being a wound structure with the two separators wrapping around the electrode assembly along a periphery of the electrode assembly;
   a termination line of the electrode assembly being formed by tail ends of the two separators;
   each of the two separators exceeding the electrode plates at two opposite ends of each of the two separators in the length direction; and
   the insulating tape exceeding the two separators at the two opposite ends of the two separators in the length direction.

2. The secondary battery according to claim 1, wherein the insulating tape comprises a first portion and a second portion, the second portion is bonded on the second surface, the first portion is connected to an end portion of the second portion and bonded on the first surface.

3. The secondary battery according to claim 2, wherein in the width direction, an end portion of the first portion away from the second portion does not exceed a midline of the first surface.

4. The secondary battery according to claim 3, wherein a dimension of the first portion in the width direction is larger than 2 mm.

5. The secondary battery according to claim 1, wherein a thickness of the insulating tape is 10 µm~50 µm.

6. The secondary battery according to claim 1, wherein the insulating tape at least covers a part of the termination line.

7. The secondary battery according to claim 1, wherein the insulating tape is provided as plurality in number, the plurality of insulating tapes comprise a first insulating tape and a second insulating tape, the first insulating tape and the second insulating tape are respectively provided on two second surfaces;
   in the length direction, two ends of the first insulating tape and two ends of the second insulating tape exceed the electrode plate.

8. The secondary battery according to claim 1, wherein the insulating tape is provided as plurality in number, the plurality of insulating tapes comprises a first insulating tape and a second insulating tape;
   the first insulating tape and the second insulating tape are provided on one second surface and spaced apart from each other in the length direction;
   in the length direction, an end portion of the first insulating tape away from the second insulating tape exceeds one end of the electrode plates in the length direction, an end portion of the second insulating tape away from the first insulating tape exceeds another end of the electrode plates in the length direction that is opposite to the one end of the electrode plates.

9. The secondary battery according to claim 1, wherein the pouch comprises two packaging films, and at least one packaging film forms a cavity, the two packaging films are connected to form a sealing portion around the cavity;
   the electrode assembly is positioned between the two packaging films and received in the cavity,
   each packaging film comprises a protecting layer, a metal layer and a connecting layer, the connecting layer is provided on a surface of the metal layer facing the first surface of the electrode assembly, the protecting layer is provided on a surface of the metal layer away from the electrode assembly; and
   the electrode lead passes through between the two packaging films.

10. The secondary battery according to claim 2, wherein a dimension of the first portion in the width direction is larger than 2 mm.

11. The secondary battery according to claim 2, wherein a thickness of the insulating tape is 10 µm~50 µm.

12. The secondary battery according to claim 11, wherein in the width direction, an end portion of the first portion away from the second portion does not exceed a midline of the first surface.

13. The secondary battery according to claim 12, wherein a dimension of the first portion in the width direction is larger than 2 mm.

14. The secondary battery according to claim 2, wherein the insulating tape at least covers a part of the termination line.

15. The secondary battery according to claim 14, wherein in the width direction, an end portion of the first portion away from the second portion does not exceed a midline of the first surface.

16. The secondary battery according to claim 15, wherein a dimension of the first portion in the width direction is larger than 2 mm.

17. The secondary battery according to claim 2, wherein the insulating tape is provided as plurality in number, the plurality of insulating tapes comprise a first insulating tape and a second insulating tape, the first insulating tape and the second insulating tape are respectively provided on two second surfaces;
   in the length direction, two ends of the first insulating tape and two ends of the second insulating tape exceed the electrode plate.

18. The secondary battery according to claim 2, wherein the insulating tape is provided as plurality in number, the plurality of insulating tapes comprises a first insulating tape and a second insulating tape;

the first insulating tape and the second insulating tape are provided on one second surface and spaced apart from each other in the length direction;

in the length direction, an end portion of the first insulating tape away from the second insulating tape exceeds one end of the electrode plates in the length direction, an end portion of the second insulating tape away from the first insulating tape exceeds another end of the electrode plates in the length direction that is opposite to the one end of the electrode plates.

19. The secondary battery according to claim 2, wherein the pouch comprises two packaging films, and at least one packaging film forms a cavity, the two packaging films are connected to form a sealing portion around the cavity;

the electrode assembly is positioned between the two packaging films and received in the cavity, each packaging film comprises a protecting layer, a metal layer and a connecting layer, the connecting layer is provided on a surface of the metal layer facing the first surface of the electrode assembly, the protecting layer is provided on a surface of the metal layer away from the electrode assembly; and the electrode lead passes through between the two packaging films.

20. The secondary battery according to claim 1, wherein an elastic modulus of the insulating tape being between 1 Gpa and 6 Gpa.

\* \* \* \* \*